Sept. 1, 1970 J. U. LEMKE 3,526,598
MANUFACTURE OF MAGNETIC RECORDING MEDIA
Filed May 2, 1968
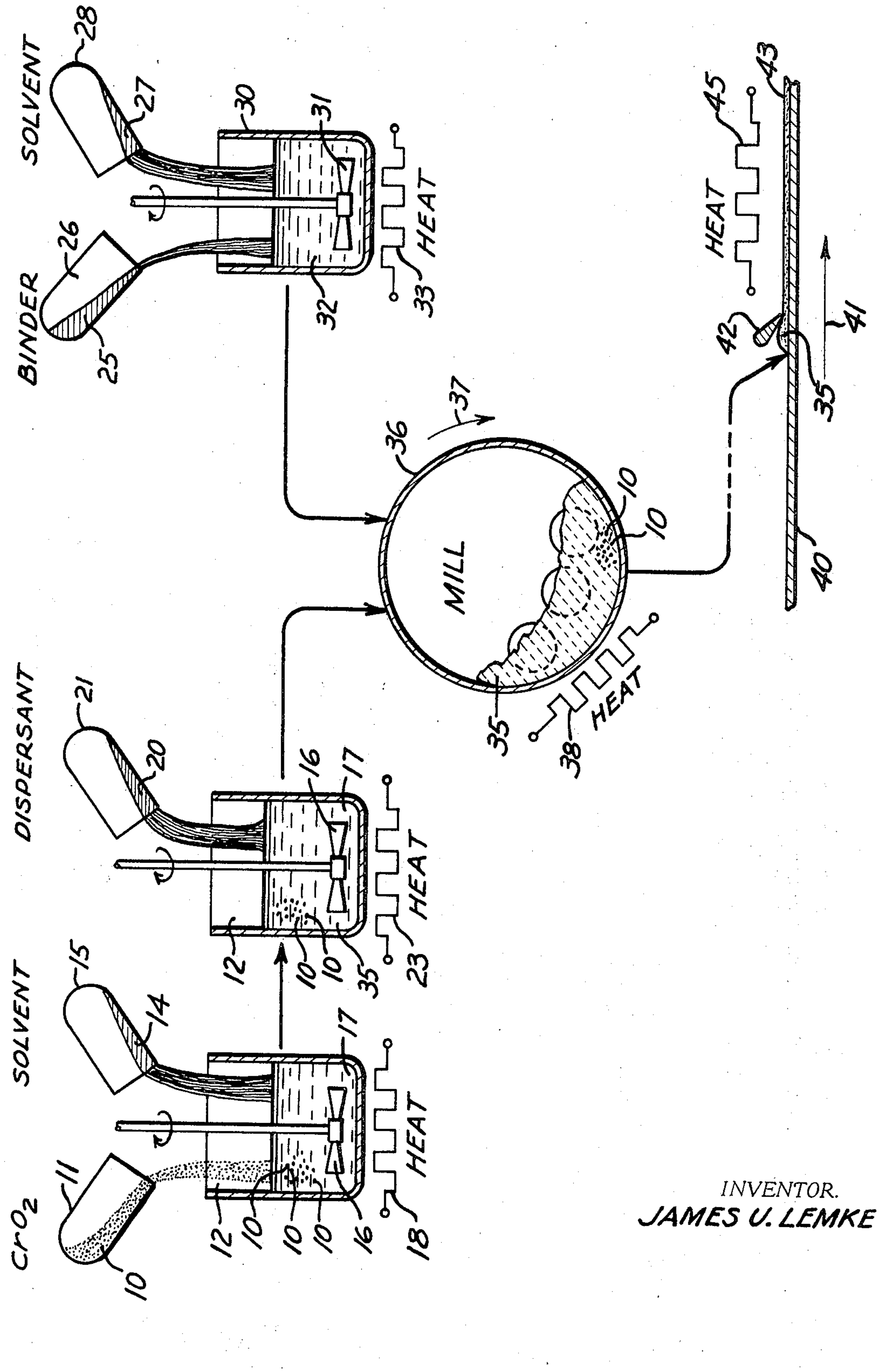
INVENTOR.
JAMES U. LEMKE United States Patent Office 3,526,598
Patented Sept. 1, 1970

3,526,598

MANUFACTURE OF MAGNETIC RECORDING MEDIA

James U. Lemke, Sierra Madre, Calif., assignor to Bell & Howell Company, Chicago, Ill., a corporation of Illinois Filed May 2, 1968, Ser. No. 726,063
Int. Cl. G11b *5/62*
U.S. Cl. 252—62.51 2 Claims

ABSTRACT OF THE DISCLOSURE

A method of improving the dispersion of particles of ferromagnetic material in a magnetic recording medium by suspending ferromagnetic properties of said particles during the manufacture of said recording medium, and magnetic recording media manufactured by employing such a method.

CROSS-REFERENCES TO RELATED APPLICATIONS

U.S. patent applications Ser. Nos. 649,540 and 696,601, filed, respectively, June 28, 1967 and Jan. 9, 1968, by James U. Lemke and assigned to the subject assignee.

BACKGROUND OF THE INVENTION

Field of the invention

The subject invention relates to the manufacture of magnetic recording media and, more particularly, in the manufacture of recording media in which ferromagnetic particles are dispersed. The invention relates also to magnetic recording media manufactured by any one of the methods disclosed herein.

Description of the prior art

It is known that the performance of magnetic recording media can be improved by increasing the dispersion of the constituent ferromagnetic particles.

That is particularly true in the case of magnetic recording tapes in which the ferromagnetic particles are given acicular shapes and are oriented in the intended direction of magnetization.

A similar requirement exists in certain ferromagnetographic processes in which a magnetic information pattern is established on a magnetic recording medium by a process involving the passing of radiant energy through the recording medium. The success of such techniques is frequently dependent on the transparency of the magnetic medium. An increased dispersion of the ferromagnetic particles in the recording medium generally augments such transparency.

Heretofore, the very property of the ferromagnetic particles that made them valuable in recording media, namely their ferromagnetism, was also the factor which impeded a dispersion of such particles. In practice, ferromagnetic particles not only have a tendency to agglomerate, but—once agglomerated—are difficult to separate.

In the manufacture of recording media of the above mentioned type, it is customary to incorporate the ferromagnetic particles in a binder and to mill such mixture prior to its application to a support, such as a plastic tape or sheet. The milling process had to be carried on for prolonged periods of time, typically days, in order to disjoin agglomerations of the ferromagnetic particles.

Such intense milling processes are not only time consuming, but result in a fracture of the acicular particles. Such fracture, in turn, precludes or materially impedes the attainment of an optimum preferred direction of magnetization in the recording medium, and reduces also other qualities obtainable by a shape-anisotropy of the ferromagnetic particles, such as a temperature-stable remanence or coercivity.

SUMMARY OF THE INVENTION

The subject invention overcomes or materially alleviates the above mentioned disadvantages and resides in the method of improving the dispersion of particles of ferromagnetic material in a magnetic recording medium by suspending ferromagnetic properties of these particles during the manufacture of the recording medium.

The expression "suspending" is employed herein in the sense of causing to cease temporarily.

In accordance with a preferred embodiment of the subject invention, ferromagnetic properties of the particles under consideration are suspended by heating the particles to above the Curie temperature of the ferromagnetic material of which they are made.

If the ferromagnetic properties are suspended pursuant to the subject invention, the particles in question are much easier dispersed during the above mentioned milling process, than if these particles were left to remain in their natural ferromagnetic state. Accordingly, the particle and binder mixture can be milled at relatively low energies and for comparatively short periods of time, whereby a fracture of acicular particles is at least materially reduced.

Once the particles have been heated above their Curie point, they are preferably maintained at such elevated temperature until the binder with incorporated particles has been deposited on the tape or other support of the recording medium. In fact, such elevated temperature may be maintained until the particles have become set in the recording medium through hardening of the binder material.

However, some benefits contemplated by the subject invention are already obtained even if the particles are permitted to cool prior to the application of the binder mixture to the recording tape or support. For instance, an increased dispersion of the particles under consideration is to be expected if these particles are maintained at a temperature above their Curie point during the above mentioned milling process. Since the particles are not completely mobile in the above mentioned binder, beneficial effects in the above mentioned sense are already realized if the heating step is terminated prior to the application of the binder to the recording medium support or tape.

For optimum results, it is, however, preferred that the suspension of the ferromagnetic properties of the particles under consideration be carried on until these particles have become set as mentioned above.

A further preferred embodiment of the subject invention is characterized by an attachment of polar molecules to the particles in question either prior to or during the above mentioned suspension of their ferromagnetic properties. The polar molecules, which may be supplied by a dispersant, such as lecithin, have the purpose of further facilitating the dispersion of the particles by electrostatic repulsion. This repulsion operates particularly well if the binder material is a medium of high dielectric constant.

The subject invention extends also to magnetic recording media having particles of ferromagnetic material dispersed therein with the assistance of any one of the methods disclosed herein.

BRIEF DESCRIPTION OF THE DRAWING

The invention will become more readily apparent from the following detailed description of preferred embodiments illustrated by way of example in the accompanying drawing which is a diagrammatic flow sheet of a preferred process according to the subject invention.

DESCRIPTION OF THE PREFERRED EMBODIMENTS

The accompanying drawing illustrates the following method steps:

Particles 10 of a suitable recording material, such as chromium dioxide, are poured from a vessel 11 into a vessel 12. A suitable solvent 14 is poured from a vessel 15 into the vessel 12. Suitable solvents include aromatic, aliphatic, ketone, ester, ether, and alcohol type solvents which can withstand sustained temperatures as occurring in the process disclosed herein. The following solvents are mentioned by way of example: amyl acetate, amyl alcohol, butyl Carbitol, butyl Cellosolve, cyclohexanone, dibutyl ketone, dimethyl formamide, Cellosolve acetate, xylene, and Amsco naphthol spirits.

The particles 10 and solvent 14 are mixed in the vessel 12 with the assistance of an agitator 16 so as to produce a slurry 17 of this solvent and particles. While such slurry 17 is produced, or after the preparation of the slurry has been completed, the temperature of the particles is elevated to above the Curie point of the ferromagnetic material of which the particles are made. The drawing shows an electric resistance heater 18 for heating the slurry 17 for the purpose just mentioned. In practice, the heater 18, as well as the other heaters illustrated in the drawing, is energized from an electric power supply (not shown). Other heating means, such as infrared radiators, may be employed if desired. By way of example, if the recording material is a chromium dioxide medium having a Curie temperature of 127° C., the mixtures described herein are heated to, and are maintained at temperatures above, such Curie temperature. If a recording medium of another Curie temperature is employed, the temperature is maintained at above such other Curie temperature.

A dispersant 20 is added to the heated slurry 17 from a vessel 21 to provide polar molecules in the slurry which attach themselves to the particles 10. During this operation, the particles 10 are maintained above their Curie point by a heater 23.

The polar molecules thus attached to the particles 10 provide electrostatic repulsion forces between these particles. These forces, together with the temporary loss of ferromagnetism of the particles 10 by virtue of the above mentioned heating materially promotes the dispersion of these particles. Suitable dispersants include nonionic dispersants, such as those of the nonyl-phenyl polyether series or polyethers of alcohols with, preferably, more than five carbon atoms, such as hexanol or lauryl alcohol; amphoteric dispersants, such as soy lecithin, or fatty acid amides; anionic dispersants, such as long chain dimer acids, fatty acid salts, or Na lauryl sulfate and cationic dispersants, such as tallow dimethyl benzylammonium chloride. Amphoteric or ionic dispersants are at present believed to be preferable in the exercise of the present invention.

As shown toward the right-hand side of the drawing, a binder 25, supplied by a vessel 26, and a solvent 27 supplied from a vessel 28 are mixed in a vessel 30 by means of an agitator 31. The solvent 27 may be the same as the above mentioned solvent 14. Suitable binders include polyvinyl chloride, polystyrene, chloroprene, cumarone-indene resins, acrylonitrile copolymers, polymethyl methacrylate, polyvinyl acetate, polyvinylidene chloride, epoxies (epoxidized oils or bisphenol types), polyurethane (polyester or polyether based), and polyester.

The mixture 35 resulting from the above mentioned combination of the slurry 17 and the dispersant 20 is transferred to a ball mill 36 in which it is tumbled in a conventional manner. The mill is rotated, such as in the direction of the arrow 37, and a heater 38 symbolizes means for maintaining the particles 10 incorporated in the mixture 35 at above their Curie point during the milling process.

The mixture 32 which is produced in the vessel 30 by action of the agitator 31 may be added to the mixture 35 in the ball mill 36, or may be partially or wholly combined with the mixture 35 prior to ball milling. In either case, the temperature of the mixture 32 is elevated by means of a heater 33 to avoid a cooling of the particles 10 contained in the mixture 35 to below-Curie point temperatures.

In contrast to similar prior-art milling processes, the milling operation contemplated herein may be completed in comparatively shorter periods of time, since the dispersant 20 and the above mentioned suspension of ferromagnetic properties of the particles 10 promote a substantial dispersion of these particles.

In accordance with conventional practice, a two-part polymer system may be used for the binder 25, one part being added prior to or during milling in the mill 36, and the other part after such milling process.

After the milling process has been completed the mixture 35 is applied to a support 40, which may be a tape of Mylar (registered trademark) or another suitable plastic material. Prior to such application, the compound 35 may be filtered or subjected to another one of the processes which are conventionally employed in the manufacture of recording media between the milling and coating steps.

In principle, an increased dispersion of the particles 10 is materialized even if these particles are permitted to cool to temperatures below their Curie point after the milling operation has been completed. However, it is preferable to maintain the temperature of the particles 10 above Curie point until such particles have set in the mixture 35 by evaporation of the solvent present therein.

The tape 40 is moved in the direction of arrow 41 and a knife 42 is employed in providing a coating 43 of the mixture 35 on the tape 40. The knife 42 will also operate to orient the acicular particles 10 in a desired direction.

A heater 45 maintains the coating 43 at an elevated temperature, so that the solvent present therein will evaporate and, if desired, so that the particles 10 will only revert to their ferromagnetic state after they have become set in the coating 43.

If it is desired to orient the particles 10 in the coating 43 by a method including magnetic orientation fields, rather than mechanical stresses or shearing forces, it will be necessary to permit the particles 10 to cool to below their Curie point before they have become set in the coating 43.

It will now be recognized that the subject invention provides highly useful methods in the manufacture of magnetic recording media, such as magnetic recording tapes or magnetic media employed in magnetic printing or imaging in which magnetic materials are subjected to thermal gradient patterns for producing latent magnetic images of pictorial or other information.

In principle, the subject invention is applicable to any magnetic recording material. However, practical considerations, such as the nature of the solvent and of the binder, may prohibit use of a recording material which has a Curie point in excess of, say, 200° C. However, this is a matter of the availability of solvents, dispersants and binders or at least solvents or solvents and dispersants capable of enduring the elevated temperatures to which they are subjected.

I claim:

1. In the manufacture of a magnetic recording medium wherein ferromagnetic particles are mixed with a binder, and wherein the resulting mixture is milled to disperse said ferromagnetic particles, the improvement consisting essentially of the steps of:

elevating the temperature of said mixture to above the Curie point of said ferromagnetic particles prior to said milling; and maintaining said mixture at said elevated temperature during said milling, whereby the dispersion of said ferromagnetic particles in said mixture is improved.

2. Magnetic recording tape produced by the application of the dispersion of ferromagnetic particles prepared by the process of claim 1 on a plastic support.

References Cited

UNITED STATES PATENTS

| | | | |
|---|---|---|---|
| 3,026,215 | 3/1962 | Fukuda et al. | 252—62.54 X |
| 3,117,093 | 1/1964 | Arthur et al. | 252—62.56 X |
| 3,144,352 | 8/1964 | Talley | 252—62.54 X |
| 3,160,576 | 12/1964 | Eckert | 252—62.56 X |

TOBIAS E. LEVOW, Primary Examiner

J. COOPER, Assistant Examiner

U.S. Cl. X.R.

117—235; 252—62.54